US012465783B2

(12) United States Patent
Jafarzadeh

(10) Patent No.: US 12,465,783 B2
(45) Date of Patent: Nov. 11, 2025

(54) INGESTIBLE THERAPEUTIC DEVICE FOR THE TREATMENT OF GASTRITIS

(71) Applicant: COSMOAESTHETICS PTY LTD, Kew (AU)

(72) Inventor: Masoud Tahghighi Jafarzadeh, Kew (AU)

(73) Assignee: COSMOAESTHETICS PTY LTD, Kew (AU)

( * ) Notice: Subject to any disclaimer, the term of this patent is extended or adjusted under 35 U.S.C. 154(b) by 606 days.

(21) Appl. No.: 17/759,780

(22) PCT Filed: Feb. 1, 2021

(86) PCT No.: PCT/AU2021/050070
§ 371 (c)(1),
(2) Date: Jul. 29, 2022

(87) PCT Pub. No.: WO2021/151166
PCT Pub. Date: Aug. 5, 2021

(65) Prior Publication Data
US 2023/0067979 A1 Mar. 2, 2023

(30) Foreign Application Priority Data

Jan. 31, 2020 (AU) .............................. 2020900259

(51) Int. Cl.
*A61N 5/06* (2006.01)
(52) U.S. Cl.
CPC ......... *A61N 5/0603* (2013.01); *A61N 5/0613* (2013.01); *A61N 2005/0609* (2013.01);
(Continued)

(58) Field of Classification Search
CPC ................ A61N 5/0601; A61N 5/0603; A61N 2005/0609
See application file for complete search history.

(56) References Cited

U.S. PATENT DOCUMENTS 6,097,984 A * 8/2000 Douglas ............. A61N 1/36007
607/40
2003/0020810 A1 1/2003 Takizawa et al.
(Continued)

FOREIGN PATENT DOCUMENTS

CN 102512766 A 6/2012
CN 203989504 U 12/2014
(Continued)

OTHER PUBLICATIONS

International Search Report & Written Opinion dated Apr. 30, 2021 from PCT Application No. PCT/AU2021/050070, 16 pages.

*Primary Examiner* — Allen Porter
(74) *Attorney, Agent, or Firm* — INNOVATION CAPITAL LAW GROUP, LLP; Vic Lin

(57) ABSTRACT

An ingestible gastrointestinal phototherapy device has a spherocylindrical body of non-digestible material having a cylindrical midsection and transparent light portals at ends thereof. The cylindrical midsection has control circuitry and a power source therein and each light portal is transparent and comprises an array of bioactive light source elements therein emitting bioactive light therefrom and being operably coupled to the control circuitry and power source.

53 Claims, 5 Drawing Sheets

(52) U.S. Cl.
CPC ............ *A61N 2005/0626* (2013.01); *A61N 2005/0632* (2013.01); *A61N 2005/0659* (2013.01); *A61N 2005/0663* (2013.01)

(56) References Cited

U.S. PATENT DOCUMENTS

| | | |
|---|---|---|
| 2010/0130822 A1 | 5/2010 | Katayama et al. |
| 2011/0208011 A1 | 8/2011 | Ben-Horin |
| 2012/0226335 A1 | 9/2012 | Surrenti et al. |
| 2013/0013031 A1 | 1/2013 | Ben-Yehuda et al. |
| 2015/0011912 A1* | 1/2015 | Matsuoka ............ A61B 5/4255 600/586 |
| 2016/0030765 A1* | 2/2016 | Towne ................. A61B 18/18 607/88 |
| 2019/0343425 A1 | 11/2019 | Jones et al. |

FOREIGN PATENT DOCUMENTS

| | | |
|---|---|---|
| CN | 110234399 A | 9/2019 |
| JP | 2005044766 A | 2/2005 |
| KR | 20100013652 A | 2/2010 |
| KR | 20100122986 A | 11/2010 |
| WO | 2018116216 A1 | 6/2018 |

\* cited by examiner

INGESTIBLE THERAPEUTIC DEVICE FOR THE TREATMENT OF GASTRITIS

FIELD OF THE INVENTION

This invention relates generally to an ingestible therapeutic device for the treatment of gastritis.

BACKGROUND OF THE INVENTION

Gastritis is inflammation of the lining of the stomach inducing upper abdominal pain, nausea, bloating, loss of appetite and heartburn. Complications include stomach bleeding, stomach ulcers, and stomach tumours.

Common causes include infection with *Helicobacter pylori* and use of nonsteroidal anti-inflammatory drugs.

Treatment includes medications such as antacids, H2 blockers, proton pump inhibitors viscous lidocaine or, if (*H. pylori* is present) a combination of antibiotics such as amoxicillin and clarithromycin.

Various ingestible phototherapy devices exist for the treatment of the gastrointestinal tract, including CN 203989504 U (LIFOTRONIC TECHNOLOGY CO LTD) 10 Dec. 2014 which discloses capsule photon therapy device under outside magnetic action, US 2012/0226335 A1 (SURRENTI et al.) 6 Sep. 2012 which discloses an ingestible device designed to illuminate the gastric cavity of the stomach for therapeutic purposes directed against *Helicobacter pylori* (*H. pylori*) bacteria, KR 20100013652 A (PARK MAN SU) 10 Feb. 2010, which discloses an encapsulated light treatment apparatus with capsule part switch means, CN 102512766 A (JIN DAI) 27 Jun. 2012 which discloses blue-light luminous capsule capable of being used for killing *Helicobacter pylori*, which comprises a sealed shell, US 2013/0013031 A1 (BEN-YEHUDA et al.) 10 Jan. 2013 which discloses swallowable capsule suitable for providing phototherapy to a region of a patient's gastrointestinal (GI) tract and WO 2018/116216 A2 (PROBIOMEDICA S.R.L.) 28 Jun. 2018 which discloses an ingestible capsule arranged to cross a human stomach for carrying out a phototherapic treatment arranged to combat an infection due to the presence of the bacterium *Helicobacter pylori*

Furthermore, various swallowable imaging devices exist, including US 2010/0130822 A1 (KATAYAMA et al.) 27 May 2010 which discloses an endoscopic imaging device which is designed to float upright in stomach liquid, US 2003/0020810 A1 (TAKIZAWA et al.) 30 Jan. 2003 which discloses capsule-type medical apparatus for imaging.

The present invention seeks to provide an ingestible therapeutic device which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

According to a first aspect, there is provided an ingestible gastrointestinal phototherapy device comprising a spherocylindrical body of non-digestible material having a cylindrical midsection and transparent light portals at end thereof.

The cylindrical midsection comprises control circuitry and a power source therein and wherein each light portal is transparent and comprises an array of bioactive light source elements therein emitting bioactive light therefrom and being operably coupled to the control circuitry and power source.

Problems exist however with adequately illuminating the interior surface of the gastrointestinal tract wherein, for example, the solution proposed by LIFOTRONIC TECHNOLOGY CO LTD may not adequately treat the gastrointestinal tract immediately adjacent the capsule. BEN-YEHUDA et al. proposes a solution of a casual having a transparent midsection comprising a pair of LEDs which reflect light via conical reflectors from the sides of the capsule.

However, such an arrangement occupies internal space which could otherwise pack control circuitry and power sources and, as such, the present light source elements comprise an axial light source element orientated along a longitudinal axis of the spherocylindrical body and a plurality of radial light source elements around the axial light source element, each radial light source element orientated substantially orthogonally with respect to the longitudinal axis, having a cast angle of greater than 100° along the longitudinal axis and located within a respective portal. As such, light cast by radial light source elements from opposite ends of the body coincides at a midpoint having a perpendicular distance from the side of the cylindrical midsection being less than half and the distance between the longitudinally aligned radial light source elements. This configuration minimizes dark zone dead spot regions adjacent the midsection.

In this way, the light source arrays at either end of the capsule allow for the packing of control circuitry and an increased capacity power source within a midsection of the capsule, thereby allowing for a small form factor capsule which can yet adequately treat the gastrointestinal tract adjacent the capsule.

With the foregoing in mind, in accordance with one embodiment, there is provided an ingestible gastrointestinal phototherapy device comprising a spherocylindrical body of non-digestible material having a cylindrical midsection and transparent light portals at ends thereof, the cylindrical midsection comprising control circuitry and a power source therein and wherein each light portal is transparent and comprises an array of bioactive light source elements therein emitting bioactive light therefrom and being operably coupled to the control circuitry and power source and wherein the light source elements comprise an axial light source element orientated along a longitudinal axis of the spherocylindrical body and a plurality of radial light source elements around the axial light source element, each radial light source element orientated substantially orthogonally with respect to the longitudinal axis, having a cast angle of greater than 100° along the longitudinal axis and located within a respective portal such that light cast by radial light source elements from opposite ends of the body coincides at a midpoint having a perpendicular distance from the side of the cylindrical midsection being less than half and the distance between the longitudinally aligned radial light source elements.

Each radial light source element may be located beyond a base of the respective portal.

Each radial light source element may be located on a respective outer surface of a plinth extending from the base of the respective portal.

Each light portal may comprise a distal hemispherical section and a proximal cylindrical section adjacent the midsection.

Each radial light source element may have a cast angle of approximately 120° along the longitudinal axis.

Each radial light source element may have a cast angle in a plane orthogonal respect to the longitudinal axis of greater than 100°.

Each radial light source element may have a cast angle in a plane orthogonal respect to the longitudinal axis of approximately 120°.

The control circuitry may be preprogrammed with a plurality of operational modes and wherein control circuitry operates the light source elements accordingly.

When selecting an operational mode of operation, the control circuitry may operate the light source elements to indicate the selection of the operational mode.

The light source elements may comprise first and second sets emitting light at different wavelength ranges.

The control circuitry may operate either set depending on a selected operational mode.

The midsection may be flexible and the control circuitry may comprise a pressure switch adjacent the midsection to detect pressure applied to the midsection.

The control circuitry may comprise at least two pressure switches located oppositely with respect to the longitudinal axis.

The control circuitry may comprise a wireless transceiver.

The wireless transceiver may comprise an antenna responsive to a radio frequency such that the control circuitry selects a mode of operation when exposed to the frequency.

The wireless transceiver may be a wireless data transceiver.

The first set may emit light in the wavelength range of 660 and 680 nm.

The first set may emit light in the wavelength range of 510-810 nm.

The light portal may comprise at least one lens.

The at least one lens may comprise a plurality of adjacent lenses.

The plurality of adjacent lenses may be hexagonal.

The control circuitry may comprise a sensor and the control circuitry may be configured to detect a peristaltic wave characteristics in the at least one sensor and to infer a location within a gastrointestinal tract according to the peristaltic wave characteristic and wherein the control circuitry controls the at least one light source element according to the location.

The control circuitry may differentiate between the large and small intestines according to a frequency peristaltic wave characteristic.

The sensor may comprise an accelerometer which detects acceleration of the body when a peristaltic wave occurs within the gastrointestinal tract.

The sensor may comprise a pressure sensor which detects pressure changes to the body when a peristaltic wave occurs within the gastrointestinal tract.

The sensor may comprise an audio sensor which detects audio frequencies generated when a peristaltic wave occurs within the gastrointestinal tract.

The control circuitry may control at least one light source element according to the location by operating the at least one light source element at a first location and not operating the at least one light source element at a second location.

The light source elements may comprise first and second sets emitting light at different wavelength ranges and wherein the control circuitry controls the light source elements to emit light at different wavelength ranges depending on the location.

The light source elements may comprise first and second sets emitting light of different wavelength ranges and wherein the control circuitry may comprise an orientation sensor which determines an orientation of ingestion and wherein the control circuitry controls the first and second sets to emit light frequency forward of the body at a different frequency as to rearward of the body.

The device may comprise a deployable anchor mechanism may comprise at least one extendable anchor leg.

The anchor leg may extends via a port through the body.

The anchor leg may be flexible.

The anchor leg may comprise inherent curvature.

The anchor leg may be located at an end of the body and wherein the anchor leg curves towards the opposite end.

A proximal end of the anchor leg may comprise a magnetically attractable lug located within a barrel comprising first and second annular electromagnets each of which can be controlled by the control circuitry to extend and retract the anchor leg.

The control circuitry may comprise a timer and wherein the control circuitry may be configured to extend the anchor leg after a first period.

The control circuitry may be further configured for attracting the anchor leg after a second period after the first period.

The control circuitry may comprise a wireless transceiver and wherein the control circuitry may be configured to extend or retract the anchor leg according to wireless signals received via the wireless transceiver.

The control circuitry may comprise a sensor and wherein the control circuitry may be configured to detect a peristaltic wave characteristics in the at least one sensor and to infer a location within a gastrointestinal tract according to the peristaltic wave characteristic and wherein the control circuitry extends or retract the anchor leg according to the location.

The power supply may comprise a supercapacitor.

The supercapacitor may have a specific energy of greater than 4 Wh/kg.

The device may be configured to power the LEDs for more than three hours.

The self-discharge time of the supercapacitor at room temperature may be greater than one week.

The device may be attached to a thread.

The device may comprise a connection to which the thread may be attachable.

One of the light portal may comprise the connection and wherein the connection may be a slotted recess into which a conforming engagement piece attached to the threaded engaged.

Both of the light portals may comprise slotted recesses.

The thread may comprise conforming engagement pieces at either end thereof for attaching the device to an adjacent device.

The device may comprise a spool of the thread.

The spool may be internally located.

The spool may be located within one of the light portals.

The spool may be wound one around a collar at the midsection.

The spool may be covered with a removable layer.

The thread may comprise ingestion depth markings therealong.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
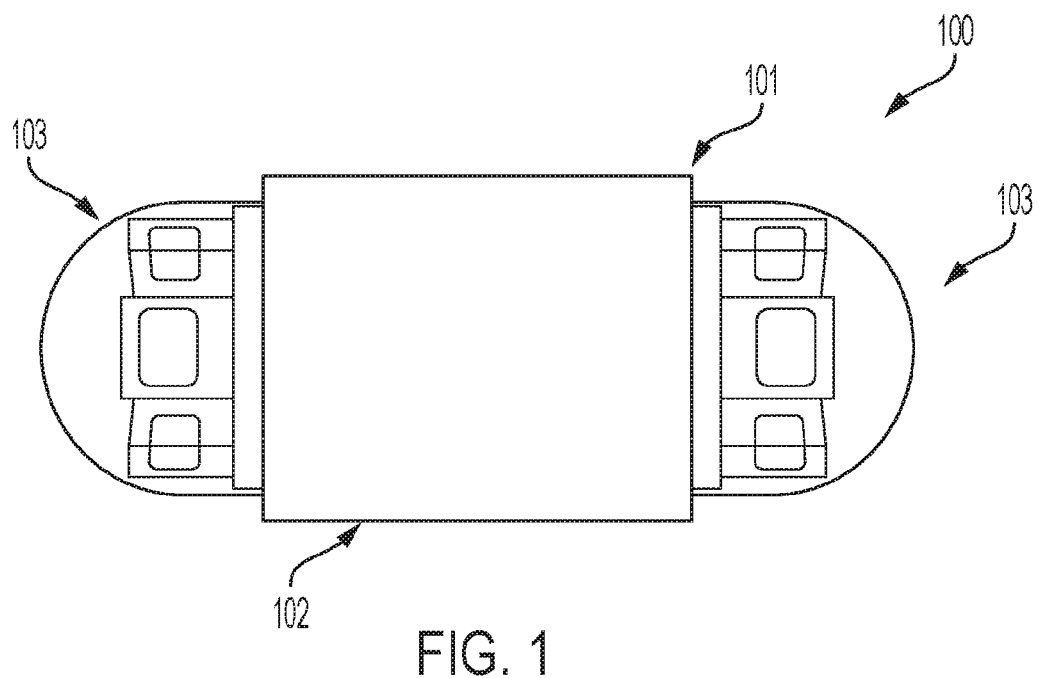
FIG. 1 shows a side view of an ingestible gastrointestinal phototherapy device in accordance with an embodiment.

An ingestible gastrointestinal phototherapy device 100 comprises a non-digestible spherocylindrical body 101 having a cylindrical midsection 102 and clear light portal ends 103.

The cylindrical midsection 102 comprises control circuitry 104 and a power source 105 therein.

The control circuitry 104 may comprise a microprocessor 106 drawing power from the power source 105. The microprocessor 106 comprise a processor for processing digital data. A memory device in operable communication with the processor via a system bus may store digital data including computer program code instructions. In use, the processor may fetch these computer program code instructions and associated data for implementing the functionality described herein.

The power source 105 may have sufficient capacity for powering the device 100 for more than 20 minutes.

In an embodiment, the power source 105 comprises a supercapacitor thereby avoiding toxic materials used by electrodes or electrolytes of certain batteries such as lead, mercury, and cadmium.

Preferably, the supercapacitor has a specific energy of greater than 4 Wh/kg. Further preferably, the self-discharge time at room temperature of the supercapacitor is greater than one week. In alternative embodiments, for higher power application and for longer shelf life, longer term pseudocapacitors and hybrid (Li-Ion) supercapacitors may be employed.

Each light portal 103 is transparent and comprises an array of bioactive light source elements 107 therein operably coupled to the control circuitry 104 via switches 131. Each portal 103 may comprise a transparent shell and be hollow or filled with transparent filler.

The shell may be shaped to define at least one lens to focus and/or disperse light from the elements 107, the at least one lens may comprise a plurality of adjacent lenses. Furthermore, the lens may be hexagonal. The base 108 of the portal 103 may comprise a reflective lining.

The light source elements 107 may comprise LEDs emitting light in the wavelength range of 660 and 680 nm to address inflammation and promote healing and/or 510-810 nm to reduce sensitivity and infection.

Figure 2:
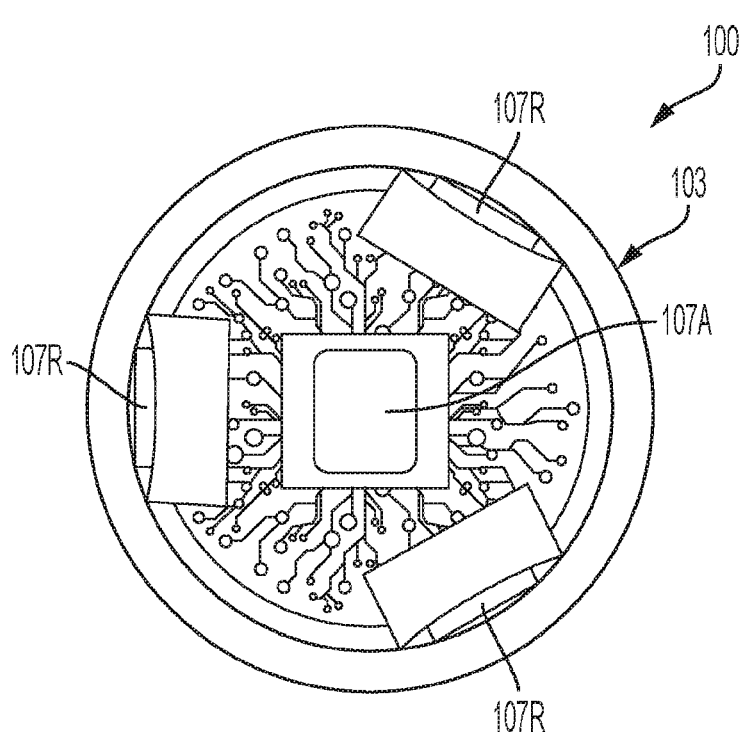
FIG. 2 shows an end of the device.
Figure 3:
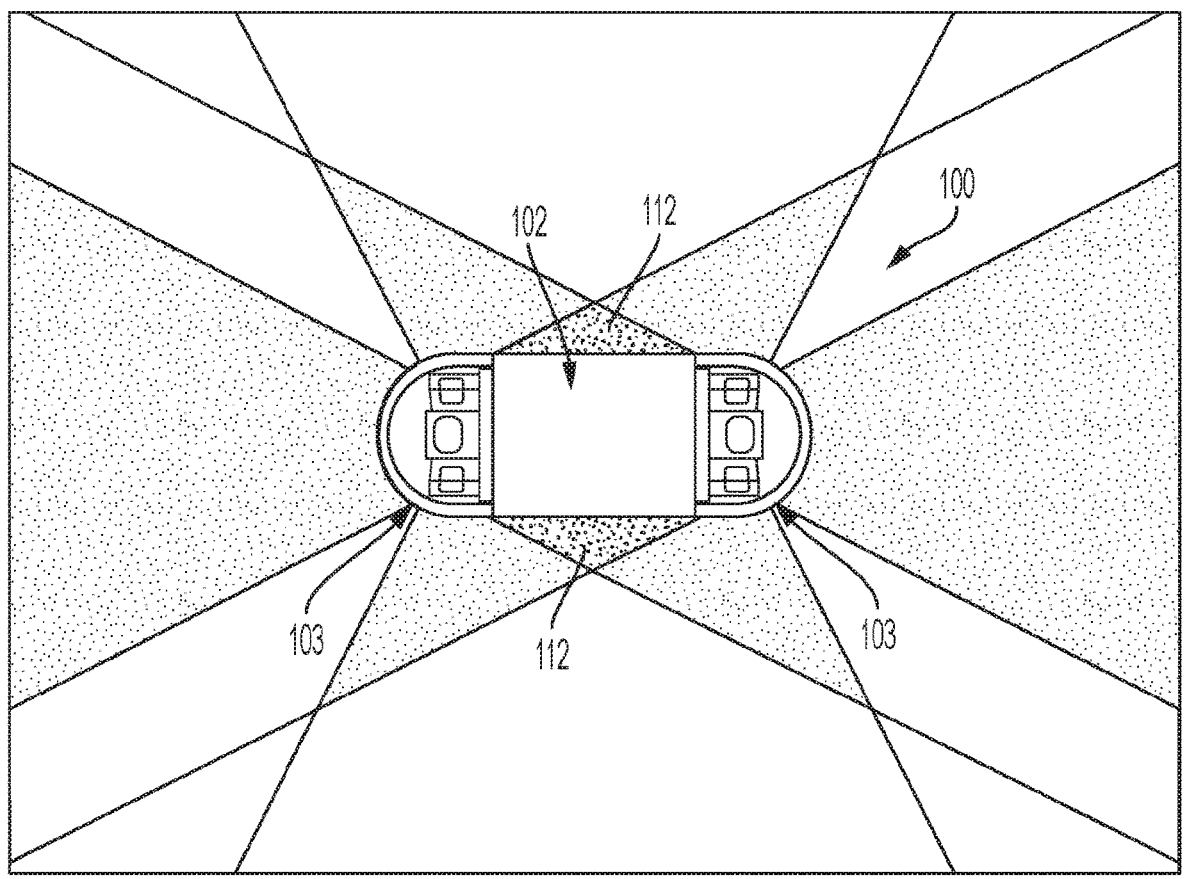
FIG. 3 shows a side view of the device illustrating light cast by the light source arrays of the device.

The light source elements 107 may comprise an axial light source element 107A orientated along a longitudinal axis 108 of the body 101. Furthermore, the light source elements 107 comprise a plurality of radial light source elements 107R around the axial light source element 107A. As is shown in FIG. 2, the device 100 may comprise three radial light source elements 107R offset at 120° with respect to each other.

Each radial light source element 107R is orientated substantially orthogonally with respect to the longitudinal axis 108 and have a cast angle θ 130 of greater than 100° along the longitudinal axis 108 and each radial light source element 107 may be located within a respective portal 103 beyond a base 108 of the respective portal 103 such that light cast by radial light source elements 107R at opposite ends of the body 101 coincide at a midpoint 109 having a perpendicular distance d 110 from the side of the cylindrical midsection 102 being less than half the length I 111 of the cylindrical midsection 102, thereby minimizing a light dead spots zone 112 surrounding the midsection 102.

Preferably, the cast angle θ along the longitudinal axis 108 is approximately 120°.

Figure 5:
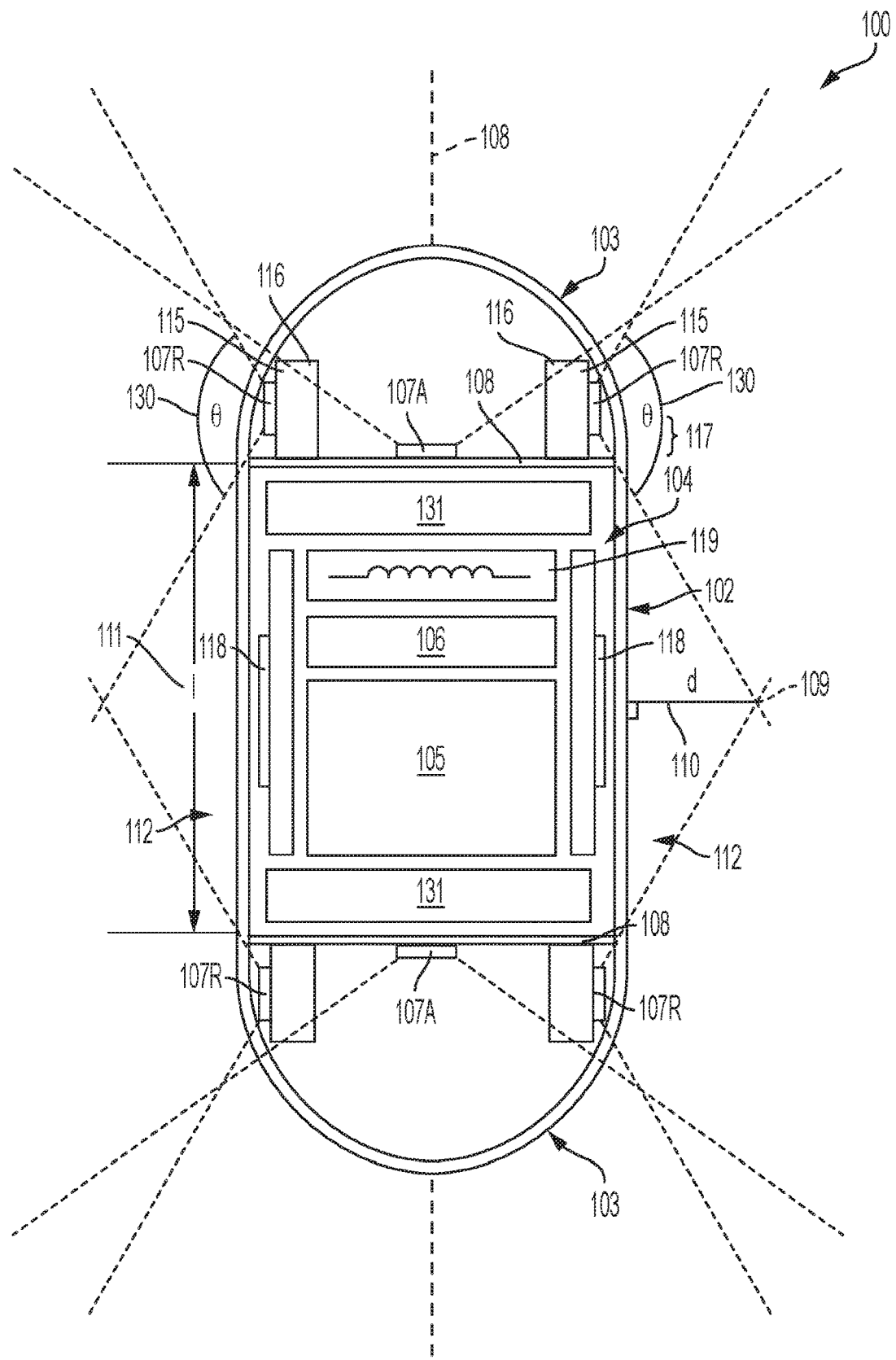
FIG. 5 shows an interior system component view of the device.

Each radial light source element 107 may be supported on an exterior surface 115 of a plinth 116 raised from the base 108 of the respective portal 103. As is shown in FIG. 5, each portal 103 preferably comprises a cylindrical section 117 to thereby allow the radial light source element 107R to locate closer to the side edge of the portal 103. As shown in FIG. 2, the exterior surface of the plinth 116 may be concave to focus light reflecting thereon from the respective light source element 107R outwardly.

Figure 4:
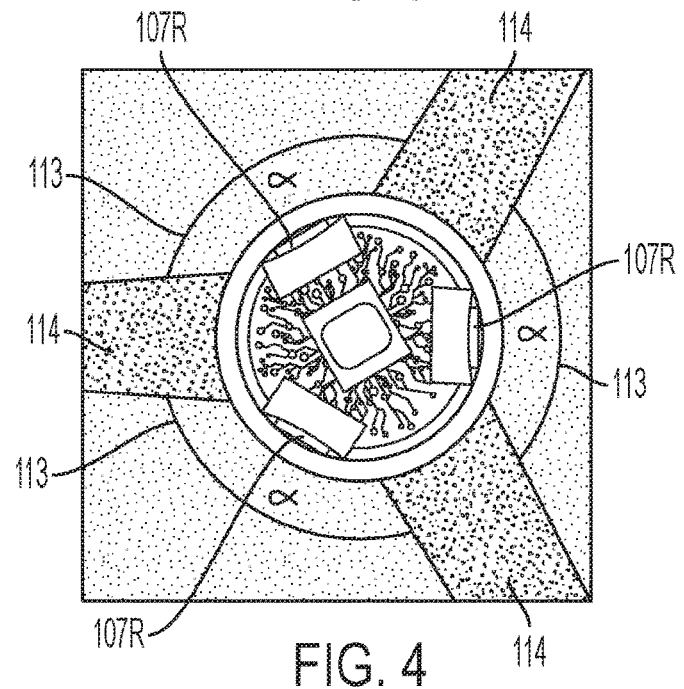
FIG. 4 shows an end of the device illustrating light cast by the light source arrays.

As is shown in FIG. 4 each radial light source element 107R may further have a cast angle α 113 in a plane orthogonal respect to the longitudinal axis 108 of greater than 100° to thereby minimize radial dead spots zones 114 between the radial light source elements 107. Preferably, the cast angle α 113 in the plane orthogonal with respect to the longitudinal axis 108 is approximately 120°.

The control circuitry 104 may be preprogrammed with a plurality of operational modes wherein the control circuitry 104 controls the light source elements 107 accordingly.

Reference to FIG. 5, the midsection 102 may be slightly flexible and the control circuitry 104 may comprise a pressure switch 118 adjacent the slightly flexible midsection 102 to detect when the device 100 is being squeezed. In the embodiment shown, the control circuitry 104 comprises more than one pressure switch 118 located at opposite sides of the section 102 so as to be able to detect when opposite sides of the midsection 102 are being squeezed, such as between one's fingers. In a preferred embodiment, the control circuitry comprises a number of pressure switches 118 around the midsection 102 so as to be able to detect squeezing of the midsection 102 from various sides thereof.

The control circuitry 104 may cycle between the operational modes when the contact switch 118 is activated.

In embodiments, the control circuitry 104 may comprise a wireless transceiver 118.

The wireless transceiver 118 may be an inductive coil sensitive to a specific radio frequency. As such, the device 100 may be activated by holding the device adjacent an activation device emitting the radio frequency.

In embodiments, the wireless transceiver 119 may be a wireless data transceiver so as to be in operable communication with an electronic device such as a base station, mobile phone device or the like. The control circuitry 104 may communicate via the wireless data transceiver using Wi-Fi, Bluetooth and/or similar wireless protocols.

Similarly, the control circuitry 104 may cycle between the modes of operation according to signals or data received via the wireless transceiver 119.

In embodiments, the light source elements 107 comprise first and second sets of light source elements 107 emitting bioactive light at different frequencies. For example, the first set of elements may emit light in the wavelength range of 660 and 680 nm to address inflammation and promote healing and the second set of elements 107 may emit light in the wavelength range of 510-810 nm to reduce sensitivity and infection.

As such, prior ingestion, the present switches 118 or the wireless transceiver 119 may be controlled to select the appropriate mode of operation for the capsule, such as whether the device is to address information and promote healing or to reduce sensitivity and infection.

In embodiments, when cycling between the modes of operation, the control circuitry 104 may control the elements 107 to indicate selection of a mode of operation. For example, for a first mode of operation, the control circuitry 104 may flash the light source elements 107 once whereas for a second mode of operation, the control circuitry 104 may flash the light source elements 107 twice.

In embodiments the light source elements 107 may emit light at different frequencies from different ends of the device 100.

In accordance with this embodiment, the control circuitry 104 may comprise an orientation sensor therein to determine the orientation of the device 100 within the GI tract and wherein the control circuitry 104 operates the light source elements 107 to emit a first wavelength range of light down the GI tract and a second wavelength range of light up the GI tract. For example, once ingested, and once the control circuitry 104 has determined the insertion orientation of the device 100 within the GI tract, the control circuitry 104 may control the forward light source elements 107 to emit light in the wavelength range of 510-810 nm to reduce sensitivity and infection on the lining of the GI tract in front of the device 100 and to control the rearward light source elements 107 to emit light in the wavelength range of 660 and 680 nm to address inflammation and promote healing rearward of the device 100.

In embodiments, once activated, the control circuitry 104 may delay for a period prior activating the light source elements 107.

In embodiments, the control circuitry 107 may employ sensors to measure peristaltic waves occurring in the oesophagus, stomach, large and small intestines to infer the location of the device 100 within the body and control the light source elements 107 accordingly.

For example, once past the stomach, typical peristaltic waves typically last a few seconds within the small intestine wherein, once in the large intestine, general contractions may occur only three times per day.

The sensor may include an accelerometer which a measure slight acceleration of the device 100 with each passing peristaltic waves. Further, the sensor may include a pressure sensor which may measure pressure differentials on the body 101 with each passing peristaltic wave. Yet further, the sensor may include an acoustic sensor which may detect peristaltic waves by soundwaves generated with each passing peristaltic wave.

As such, the control circuitry 104 may be preprogramed to illuminate only certain parts of the GI tract such as wherein the device 100 is programmed to treat only the small intestine. Furthermore, the control circuitry 104 may be preprogramed to illuminate certain parts of the GI tract with different wavelength ranges of light.

Figure 6:
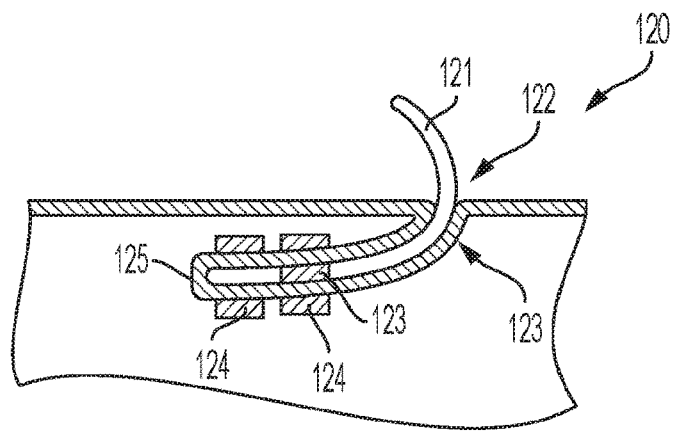
FIG. 6 shows a deployable anchor leg of the device in accordance an embodiment.
Figure 7:
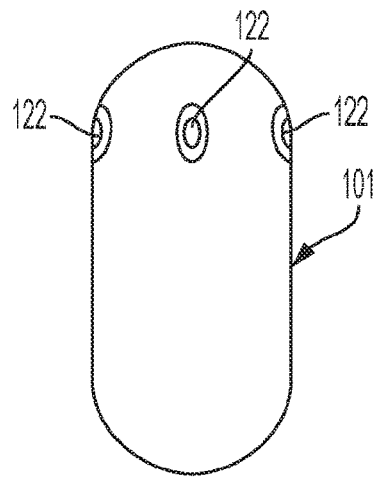
FIG. 7 shows the device with a plurality of anchor legs thereof retracted.
Figure 8:
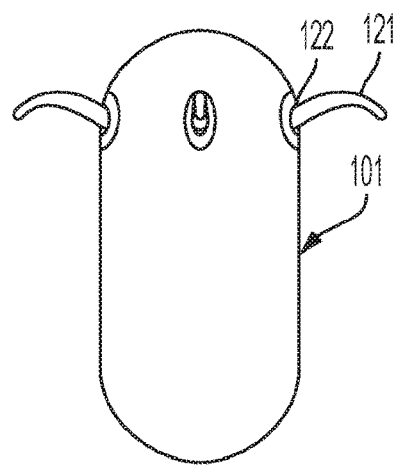
FIG. 8 shows the device of the plurality of anchor legs thereof extended.

FIGS. 6-8 show an embodiment wherein the device 100 includes a deployable anchor mechanism 120 to anchor the device 100 or slow the passage of the device 100 within a certain region of the GI tract to increase well time thereof and therefore bioactive light dosage. As shown in FIG. 6, the anchor mechanism 120 may comprise an anchor leg 121 which deploys radially from a port 122 through a side of the body 101.

The anchor leg 121 may be flexible, such as made of silicon and/or rubber. Furthermore, the anchor leg 121 may have a curvature bias such that when extending from the port 122 curves in the manner illustrated in FIGS. 6 and 8. The port 122 may be located at one end of the body 101 and the accolades 122 may curve towards the opposite end, thereby dragging against the lining of the GI tract.

Alternatively, the anchor leg 122 may be curved or orientated by the curvature of an exit passage 123 at the port 122.

As is shown in FIG. 6, a proximal end of the anchor leg 121 may comprise a magnet or metallic lug 123 which is attractable between first and second electromagnets 124 within a barrel 125. The control circuitry 104 may control either of the electro magnet is 124 to extend and retract the anchor leg 121.

Figure 9:
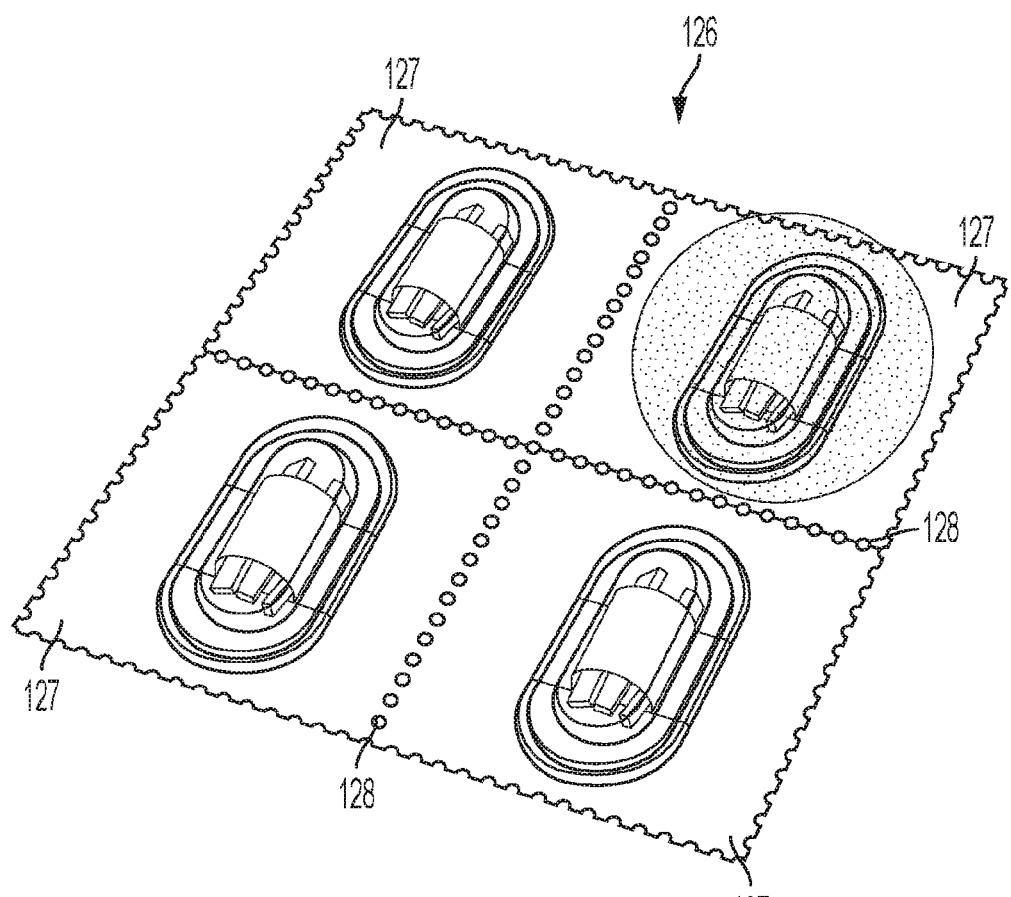
FIG. 9 shows blister packaging comprising a plurality of devices in accordance with an embodiment.

FIG. 9 shows wherein the capsules 100 are provided within blister packaging 126. The blister packaging 126 may comprise a plurality of tear-away sections 127 with perforations 128 therebetween. The packaging may comprise a backing and a transparent portal 129 thereon securing the device 100 therebetween ready for use.

The device 100 may be held in ingestible oil lubricant for lubrication purposes when swallowed.

In an embodiment, the device 100 is attachable to a non-digestible polymer thread (not shown) so that once the device 100 is ingested, the device 100 may be temporarily retained at a particular location within the gastrointestinal tract by the thread to allow targeting of specific areas of the gastrointestinal tract. In one embodiment, the device 100 comprises a connection to which the thread may be connected. For example, one of the light portals 103 may comprise a slotted recess into which a conforming plastic engagement piece attached to the thread is engaged and held tight. The recess may be ergonomically recess without sharp corners of protrusions to allow the utilization of the device 100 without the thread attached. In this manner, where the device 100 is required to be held at a particular location of the gastrointestinal tract to target the particular location, the conforming plastic piece at the end of the thread may be engaged within slotted recess to connect the thread to the device 100.

In alternative embodiments, the device 100 comprises a spool of thread which may be unspooled for use. The spool may be internally located, such as within one of the light portals 103. Alternatively, the thread may be wound around a collar at a midsection of the device 100. The collar may be covered with a covering to conceal the thread thereunderneath when not required for use, such as tear-away foil plastic which may be removed to retrieve the thread therefrom.

Post application, the device 100 may be retrieved via the thread 100 or alternatively allowed to pass through the gastrointestinal tract.

In embodiments, a plurality of devices 100 may be connected together in a chain of interconnecting thread pieces. In accordance with this embodiment, the device 100 may comprise connections at either end. For example, each light portal 103 may comprise the slotted recess wherein short interconnecting non-digestible thread pieces having corresponding plastic connectors at either end thereof may be used to link adjacent devices 100 together. In this way, greater regions of the gastrointestinal tract may be targeted with a chain of devices 100. For example, a plurality of devices 100 forming a 20 cm chain may be interconnected together to target 20 cm of the small intestine. In embodiments, the most proximal threaded (the one controlled by the physician) may comprise markings thereon indicative of the location of the device 100 within the body (ingestion depth).

In embodiments, the device 100 may be inserted rectally as opposed to being ingested.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. An ingestible gastrointestinal phototherapy device comprising:
   a spherocylindrical body of non-digestible material having a cylindrical midsection and transparent light portals at ends thereof, the cylindrical midsection comprising control circuitry and a power source therein and wherein each light portal is transparent and comprises an array of bioactive light source elements therein emitting bioactive light therefrom and being operably coupled to the control circuitry and power source and wherein the light source elements comprise an axial light source element orientated along a longitudinal axis of the spherocylindrical body and a plurality of radial light source elements around the axial light source element, each radial light source element orientated substantially orthogonally with respect to the longitudinal axis, having a cast angle of greater than 100° along the longitudinal axis and located within a respective portal such that light cast by radial light source elements from opposite ends of the body coincides at a midpoint having a perpendicular distance from the side of the cylindrical midsection being less than half of a distance between the longitudinally aligned radial light source elements; and
   a deployable anchor mechanism including at least one extendable, flexible anchor leg, wherein:
      the anchor leg extends via a port through the body; and
      a proximal end of the anchor leg comprises a magnetically attractable lug located within a barrel comprising first and second annular electromagnets each of which can be controlled by the control circuitry to extend and retract the anchor leg.

2. The device as claimed in claim 1, wherein each radial light source element is located beyond a base of the respective portal.

3. The device as claimed in claim 2, wherein each radial light source element is located on a respective outer surface of a plinth extending from the base of the respective portal.

4. The device as claimed in claim 3, wherein each light portal comprises a distal hemispherical section and a proximal cylindrical section adjacent the midsection.

5. The device as claimed in claim 1, wherein each radial light source element has a cast angle of approximately 120° along the longitudinal axis.

6. The device as claimed in claim 1, wherein each radial light source element has a cast angle in a plane orthogonal respect to the longitudinal axis of greater than 100°.

7. The device as claimed in claim 6, wherein each radial light source element has a cast angle in a plane orthogonal respect to the longitudinal axis of approximately 120°.

8. The device as claimed in claim 1, wherein the control circuitry is preprogrammed with a plurality of operational modes and wherein control circuitry operates the light source elements accordingly.

9. The device as claimed in claim 8, wherein, when selecting an operational mode of operation, the control circuitry operates the light source elements to indicate the selection of the operational mode.

10. The device as claimed in claim 8, wherein the light source elements comprise first and second sets emitting light at different wavelength ranges.

11. The device as claimed in claim 10, wherein the control circuitry operates either set depending on a selected operational mode.

12. The device as claimed in claim 1, wherein the midsection is flexible and wherein the control circuitry comprises a pressure switch adjacent the midsection to detect pressure applied to the midsection.

13. The device as claimed in claim 12, wherein the control circuitry comprises at least two pressure switches located oppositely with respect to the longitudinal axis.

14. The device as claimed in claim 1, wherein the control circuitry comprises a wireless transceiver.

15. The device as claimed in claim 14, wherein the wireless transceiver comprises an antenna responsive to a radio frequency such that the control circuitry selects a mode of operation when exposed to the frequency.

16. The device as claimed in claim 14, wherein the wireless transceiver is a wireless data transceiver.

17. The device as claimed in claim 10, wherein the first set emits light in the wavelength range of 660 and 680 nm.

18. The device as claimed in claim 10, wherein the first set emits light in the wavelength range of 510-810 nm.

19. The device as claimed in claim 1, wherein the light portal comprises at least one lens.

20. The device as claimed in claim 19, wherein the at least one lens comprises a plurality of adjacent lenses.

21. The device as claimed in claim 20, wherein the plurality of adjacent lenses are hexagonal.

22. The device as claimed in claim 1, wherein the control circuitry comprises a sensor and wherein the control circuitry is configured to detect a peristaltic wave characteristics in the sensor and to infer a location within a gastrointestinal tract according to the peristaltic wave characteristic and wherein the control circuitry controls the at least one light source element according to the location.

23. The device as claimed in claim 22, wherein the control circuitry differentiates between the large and small intestines according to a frequency peristaltic wave characteristic.

24. The device as claimed in claim 22, wherein the sensor comprises an accelerometer which detects acceleration of the body when a peristaltic wave occurs within the gastrointestinal tract.

25. The device as claimed in claim 22, wherein the sensor comprises a pressure sensor which detects pressure changes to the body when a peristaltic wave occurs within the gastrointestinal tract.

26. The device as claimed in claim 22, wherein the sensor comprises an audio sensor which detects audio frequencies generated when a peristaltic wave occurs within the gastrointestinal tract.

27. The device as claimed in claim 22, wherein the control circuitry controls at least one light source element according to the location by operating the at least one light source element at a first location and not operating the at least one light source element at a second location.

28. The device as claimed in claim 22, wherein the light source elements comprise first and second sets emitting light at different wavelength ranges and wherein the control circuitry controls the light source elements to emit light at different wavelength ranges depending on the location.

29. The device as claimed in claim 1, wherein the light source elements comprise first and second sets emitting light of different wavelength ranges and wherein the control circuitry comprises an orientation sensor which determines an orientation of ingestion and wherein the control circuitry controls the first and second sets to emit light frequency forward of the body at a different frequency as to rearward of the body.

30. The device as claimed in claim 1, wherein the anchor leg is flexible.

31. The device as claimed in claim 30, wherein the anchor leg comprises inherent curvature.

32. The device as claimed in claim 31, wherein the anchor leg is located at an end of the body and wherein the anchor leg curves towards the opposite end.

33. The device as claimed in claim 1, wherein the control circuitry comprises a timer and wherein the control circuitry is configured to extend the anchor leg after a first period.

34. The device as claimed in claim 33, wherein the control circuitry is further configured for attracting the anchor leg after a second period after the first period.

35. The device as claimed in claim 1, wherein the control circuitry comprises a wireless transceiver and wherein the control circuitry is configured to extend or retract the anchor leg according to wireless signals received via the wireless transceiver.

36. The device as claimed in claim 1, wherein the control circuitry comprises a sensor and wherein the control circuitry is configured to detect a peristaltic wave characteristics in the sensor and to infer a location within a gastrointestinal tract according to the peristaltic wave characteristic and wherein the control circuitry extends or retract the anchor leg according to the location.

37. The device as claimed in claim 1, wherein the power supply comprises a supercapacitor.

38. The device as claimed in claim 37, wherein the supercapacitor has a specific energy of greater than 4 Wh/kg.

39. The device as claimed in claim 38, wherein the device is configured to power the LEDs for more than three hours.

40. The device as claimed in claim 39, wherein the self-discharge time of the supercapacitor at room temperature is greater than one week.

41. The device as claimed in claim 1, wherein the device is attached to a thread.

42. The device as claimed in claim 41, wherein the device comprises a connection to which the thread is attachable.

43. The device as claimed in claim 42, wherein one of the light portal comprises the connection and wherein the connection is a slotted recess into which a conforming engagement piece attached to the threaded engaged.

44. The device as claimed in claim 43, wherein both of the light portals comprise slotted recesses.

45. The device as claimed in claim 44, wherein the thread comprises conforming engagement pieces at either end thereof for attaching the device to an adjacent device.

46. The device as claimed in claim 41, wherein the device comprises a spool of the thread.

47. The device as claimed in claim 46, wherein the spool is internally located.

48. The device as claimed in claim 47, wherein the spool is located within one of the light portals.

49. The device as claimed in claim 48, wherein the spool is wound one around a collar at the midsection.

50. The device as claimed in claim 49, wherein the spool is covered with a removable layer.

51. The device as claimed in claim 49, wherein the thread comprises ingestion depth markings therealong.

52. An ingestible gastrointestinal phototherapy device comprising:
a spherocylindrical body of non-digestible material having a cylindrical midsection and transparent light portals at ends thereof, the cylindrical midsection comprising control circuitry and a power source therein and wherein each light portal is transparent and comprises an array of bioactive light source elements therein emitting bioactive light therefrom and being operably coupled to the control circuitry and power source and wherein the light source elements comprise an axial light source element orientated along a longitudinal axis of the spherocylindrical body and a plurality of radial light source elements around the axial light source element, each radial light source element orientated substantially orthogonally with respect to the longitudinal axis, having a cast angle of greater than 100° along the longitudinal axis and located within a respective portal such that light cast by radial light source elements from opposite ends of the body coincides at a midpoint having a perpendicular distance from the side of the cylindrical midsection being less than half of a distance between the longitudinally aligned radial light source elements;
a thread connected to the device; and
a slotted recess in one of the light portals including a conforming engagement piece engaged with the thread.

53. An ingestible gastrointestinal phototherapy device comprising:
a spherocylindrical body of non-digestible material having a cylindrical midsection and transparent light portals at ends thereof, the cylindrical midsection comprising control circuitry and a power source therein and wherein each light portal is transparent and comprises an array of bioactive light source elements therein emitting bioactive light therefrom and being operably coupled to the control circuitry and power source and wherein the light source elements comprise an axial light source element orientated along a longitudinal axis of the spherocylindrical body and a plurality of radial light source elements around the axial light source element, each radial light source element orientated substantially orthogonally with respect to the longitudinal axis, having a cast angle of greater than 100° along the longitudinal axis and located within a respective portal such that light cast by radial light source elements from opposite ends of the body coincides at a midpoint having a perpendicular distance from the side of the cylindrical midsection being less than half of a distance between the longitudinally aligned radial light source elements; and a spool of a thread internally located within one of the light portals, wherein the device is attached to the thread.

* * * * *